United States Patent [19]
Valdespino

[11] 3,918,116
[45] Nov. 11, 1975

[54] FOOD LIFT
[76] Inventor: Joseph M. Valdespino, 5023 Golf Club Parkway, Orlando, Fla. 32808
[22] Filed: Nov. 27, 1973
[21] Appl. No.: 419,402

[52] U.S. Cl. .................................. 15/3.13; 302/14
[51] Int. Cl.² .................... A23N 13/00; B65G 51/00
[58] Field of Search ...................... 15/3.13–3.16; 209/10, 173; 302/14–16, 66

[56] References Cited
UNITED STATES PATENTS

| | | | |
|---|---|---|---|
| 351,854 | 11/1886 | Delhaye | 302/58 |
| 550,244 | 11/1895 | Blagburn | 302/14 X |
| 703,916 | 7/1902 | Haley | 15/3.15 |
| 1,166,712 | 1/1916 | Otterson | 302/14 |
| 1,885,988 | 11/1932 | Chapman | 209/173 |
| 1,908,220 | 5/1933 | Chapman | 302/14 X |
| 2,049,639 | 8/1936 | Chapman | 302/14 X |
| 2,057,366 | 10/1936 | Chapman | 302/14 X |
| 2,119,006 | 5/1938 | Chapman | 209/173 X |
| 2,262,943 | 11/1941 | Kalbaugh | 302/14 X |

Primary Examiner—Evon C. Blunk
Assistant Examiner—Jeffrey V. Nase
Attorney, Agent, or Firm—Duckworth, Hobby & Allen

[57] ABSTRACT

Food elevating apparatus comprises a hopper for holding articles to be elevated in liquid suspension. An aspiration chamber having an outlet is included, with a lift tube communicating at one end with a hopper and at the other end with the aspiration chamber. A venturi nozzle extends into the aspiration chamber opposite the outlet and adjacent the other end of the tube, and means are included for pumping a fluid through the nozzle whereby the liquid suspended articles are drawn through the tube and out of the chamber.

6 Claims, 2 Drawing Figures

3,918,116

FOOD LIFT

BACKGROUND OF THE INVENTION

1. Field of the Invention

The present invention relates to apparatus for elevating fruits, vegetables, and the like, and in particular relates to such apparatus which employ aspiration means for achieving elevation.

2. Description of the Prior Art

In fruit and vegetable processing plants, it is often necessary to elevate the food product from one level to a higher level. In the past, this function has often been accomplished with conveyor belts, bucket conveyors and similar apparatus. However, these types of conveying apparatus tend to bruise the food product.

Further, it is often desirable to immerse the food in a rinsing fluid, such as water, to wash loose dirt, trash and similar matter from the product. To this end, conveyors such as that described above are operated through a fluid bath. See for example U.S. Pat. Nos. 3,288,265 to Smith, and 3,226,164 to Merrick. However, the fluid is usually not under sufficient pressure to effect an adequate rinsing function.

Various food pump arrangements have been devised in the prior art to overcome the disadvantages described above. In U.S. Pat. No. 1,827,068, Carmichael teaches a food elevator employing a suction principle with a plurality of rotating cylinders to achieve a thorough rinsing and elevation. Asgeirsson, in U.S. Pat. No. 3,413,039, discloses a series of pressurized chambers for transporting small fish and the like. Ellis, et al teach a food pump employing means for screening the rinse water for reuse; see U.S. Pat. No. 3,588,177.

Chapman, in U.S. Pat. No. 1,908,220, describes a hydraulic food conveyor. In U.S. Pat. Nos. 2,788,692 and 2,799,540, Makinson teaches conveying apparatus utilizing the aspiration principle for lifting logs from one level to a higher level. Another suction elevator arrangement is shown in U.S. Pat. No. 1,668,855 to Ludlum.

SUMMARY OF THE INVENTION

The present invention contemplates food elevating apparatus comprising a hopper for holding articles to be elevated in liquid suspension. An aspiration chamber having an outlet is included, with a tube communicating at one end with the hopper and at the other end with the aspiration chamber. A venturi nozzle extends into the aspiration chamber opposite the outlet and adjacent the other end of the tube, and means are included for pumping a fluid through the nozzle whereby the liquid suspended articles are drawn through the tube and out of the chamber.

In one arrangement, the apparatus includes a storage compartment with the output of the aspiration chamber positioned above the storage compartment so that the rinsing fluid can be returned to the storage compartment for reuse.

THE DRAWING

DETAILED DESCRIPTION

Figures 1, 2:
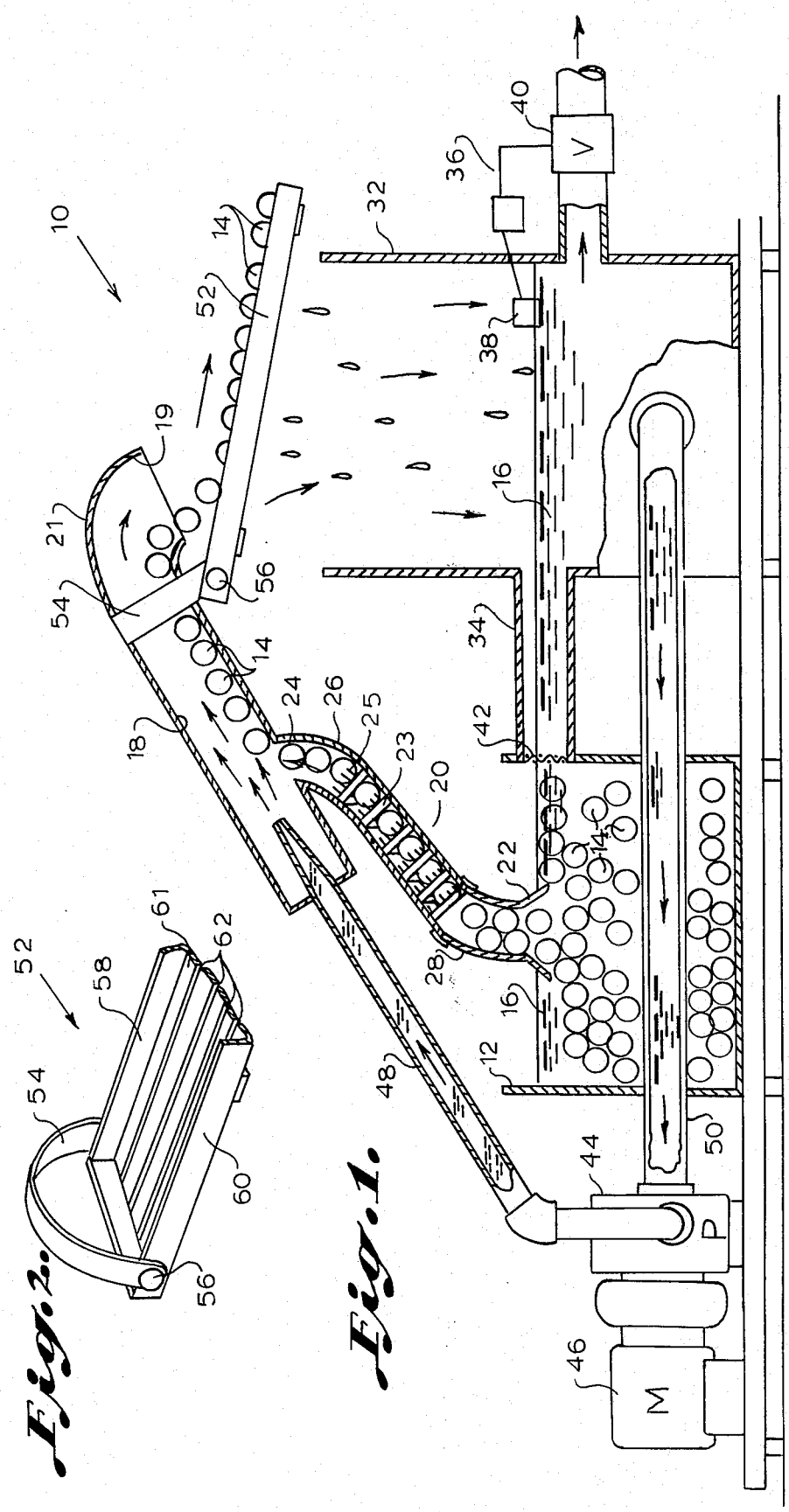
FIG. 1 is a side view, partially in cross section, of apparatus in accordance with one embodiment of the present invention.
FIG. 2 is a perspective view of the portion of the apparatus illustrated in FIG. 1.

One embodiment of food elevating apparatus according to the present invention will be described with reference to FIGS. 1 and 2.

The food elevator, referred to generally as 10, includes a hopper 12 for holding articles, such as oranges 14, suspended in a liquid 16, as water, for example. The size, shape and dimensions of the hopper 12 are not critical.

An aspiration chamber 18 is positioned above the hopper 16, with a lift tube 20 communicating at one end 22 with the hopper and at the other end with the aspiration chamber. The aspiration chamber 18 includes a downward-directed outlet opening 19 formed at a radius turn 21. The tube 20 may include turns therein, such as turns 26, 28, each turn including a curved radius. A venturi nozzle 30 extends into the aspiration chamber 18 adjacent the other end 24 of the lift tube 20. A spiral brush holder 23 is positioned along the tube 20 and holds brushes 25 which aid in cleansing fruit passing therethrough.

The elevator 10 further includes a compartment 32 for storing water 16 therein. The storage compartment 32 is positioned under the outlet opening 19 of the aspiration chamber 18. A conduit 34 communicates between the upper portion of the storage compartment 32 and hopper 12 so as to limit the flow only from the top of the water 16 into the storage compartment. An overflow valve assembly, referred to generally as 36, includes a float valve 38 and a shutoff valve 40 controlled by operation of the float valve to limit the level of water 16 in the storage compartment 32 to about the level of the conduit 34. A screen 42, or equivalent filtering means, is interposed in the feed path along the conduit 34 to remove any floating debris or other matter which has not settled to the bottom of the storage compartment 32.

The elevator also includes a pump 44 driven by a prime mover 46. The output of the pump 44 is connected to the venturi nozzle 30 by a discharge pipe 48 and to the storage compartment 32 by an input pipe 50. The diameter of the input pipe 50 is substantially larger than that of the discharge pipe 48.

In accordance with one particular aspect of this invention, a chute 52 is pivotably mounted by a strap 54 and brads 56 below the outlet opening 19 of the aspiration chamber 18. Noting FIG. 2, the chute 52 includes parallel sidewalls 58, 60 and a floor 61 having a plurality of longitudinal slots 62 therein extending parallel with the sidewalls.

The elevator 10 operates in the following manner. Initially, the fruit 14 is placed in the hopper 12 which is partially filled with water 16. The water 16 may be supplied from the storage compartment 32. When the pump 44 is energized, water 16 is drawn from the storage compartment 32 via the input pipe 50 and pumped under pressure to the venturi nozzle 30 via the discharge pipe 48. When sufficient pressure is developed by the flow of water out of the end of the venturi nozzle 30, an aspiration (pressure differential) effect is created, causing the liquid suspended fruit 14 to be drawn up the tube 20 into the aspiration chamber 18. The pressurized output of the venturi nozzle 30 then forces the fruit 14 along the wall of the aspiration chamber 18 and thence through the outlet 19. Of course, during this period the fruit 14 is sprayed with water under pressure, effecting a thorough rinsing of the fruit.

The fruit 14 then exists the aspiration chamber out at 19 and falls onto the chute 52. The fruit 14 rolls on the chute 52, while the pressurized water exiting the outlet 19 is directed through the longitudinal slot 62 and back to the storage compartment 32. Some debris, such as soil, rocks and the like which are heavier than water, settle to the bottom of the storage compartment 32. Floating debris, such as stems, leaves, etc., are trapped by the screen 42. The input pipe 50 may also include a filter for preventing the debris from being directed through the pump 44. The overflow valve assembly 36 maintains a constant water level at about the level of the conduit 34, to assure an even supply of water 16 to the hopper 12.

I claim:

1. Elevating apparatus comprising:
a hopper for holding articles to be elevated in liquid suspension;
an aspiration chamber positioned above said hopper having an outlet at one end thereof;
a tube communicating at one end with said hopper and at the other end with said aspiration chamber;
a venturi nozzle positioned above said hopper and extending into said aspiration chamber, said venturi nozzle being opposite said outlet and adjacent said other end of said tube;
means for pumping a fluid through said nozzle and across the other end of said tube in said chamber whereby said liquid suspended articles are drawn through said tube and out of said outlet;
a compartment for storing said liquid;
means for feeding said liquid out of said storage compartment and into said hopper, said feeding means further comprising means for limiting said liquid flow only from the top of liquid in said storage compartment, said limiting means comprising a conduit communicating between said hopper and an upper portion of said storage compartment and an overflow valve in said compartment for limiting said liquid level to about the level of said conduit;
means for receiving said articles at said outlet and moving said articles in a downwardly direction with respect to said outlet, said receiving means comprising a chute communicating with said outlet of said aspiration chamber, said chute being positioned above said storage compartment and having apertures therein such that said liquid flows out of said aspiration chamber downward through said apertures and into said compartment, said chute including parallel sidewalls and said apertures comprise longitudinal slots parallel with said sidewalls.

2. Apparatus as recited in claim 1 further comprising screening means interposed in the feed path of said liquid between said compartment and said hopper.

3. Apparatus as recited in claim 2 wherein said pumping means comprises:
a pump;
input means for conveying said liquid from said storage compartment to said pump;
discharge means for conveying said liquid from said pump to said venturi nozzle; and wherein
said liquid comprises said fluid.

4. Apparatus as recited in claim 3 wherein said input and discharge means comprise respective input and discharge pipes, the diameter of said input pipe being substantially larger than the diameter of said discharge pipe.

5. Apparatus as recited in claim 4 further comprising:
said tube including turns therealong;
said outlet of said aspiration chamber defining a downward turn; and wherein
said turns each define a radius.

6. Apparatus as recited in claim 5 further comprising:
a brush holder positioned along said tube; and
brushes held by said brush holder.

\* \* \* \* \*